Patented Nov. 14, 1922.

1,435,180

UNITED STATES PATENT OFFICE.

WILLIAM A. SCHLESINGER, OF DENVER, COLORADO, ASSIGNOR TO THE RADIUM COMPANY, OF COLORADO, INC., A CORPORATION OF NEW YORK.

PROCESS FOR EXTRACTING VALUES FROM ORES.

No Drawing.  Application filed May 11, 1918. Serial No. 233,843.

*To all whom it may concern:*

Be it known that I, WILLIAM A. SCHLESINGER, a citizen of the United States, and a resident of Denver, county of Denver, State of Colorado, have invented certain new and useful Improvements in the Process of Extracting Values from Ores, of which the following is a full, clear, and exact description.

This invention relates particularly to an improved process of extracting radium or radioactive compounds from carnotite, allied ores or radioactive materials. A further object of this invention is to extract from such ores uranium and vanadium.

This process is particularly advantageous in preparing ores, for a subsequent treatment with an acid leach, by first removing the sulphates therefrom, whereby in the subsequent treatment of the ore, a quantitative yield of radium is obtained. The presence of sulphates in the ore has always materially interfered with the use of acids in leaching because of the tendency of the sulphates during leaching to precipitate and render the radium insoluble.

The process throughout has in view the elimination of sulphates, both in the ores and in the materials used in treating the ores, whereby the radioactive materials are extracted in a very practical and economical process with a quantitative production of radioactive materials.

In carrying my process into effect, I proceed as follows: The ore is crushed to comminuted condition. To about a ton of ore is added a suitable alkali, preferably soda ash in proportion by weight of about thirty per cent. The mixture is charged into a suitable vessel, whereto a small amount of water is added, if desired. The water may be omitted as it does not materially add to the avantages of the treatment. The vessel is closed and the mixture is subjected to the direct treatment of live steam from about sixty-five to one hundred pounds pressure, for a period of about six hours. I have found that seven hour's treatment under a pressure of from sixty to one hundred pounds gives the best results. The proportion of alkali, the steam pressure and the length of time the ore is treated must be varied, as experience may show, according to the nature of the ore or material and other conditions. The result of this treatment is to render the sulphates, contained in the ore or material, soluble. The mixture is then drained into a filter press and filtered. The resulting solution contains a portion of the uranium and vanadium which may be recovered in any suitable manner. The resultant material remaining after the above treatment, is washed with sulphate free water and live steam until the sulphates are substantially dissolved and removed.

The treated ore, after the aforementioned process, is in condition to be treated for the recovery of its radium value particularly by acid leaching. The acid must, however, be free of sulphates, which otherwise tend to precipitate the radium values contained in the ore. Acid suitable for leaching out radium, for instance hydrochloric (28%), which is the most economical to use, in its ordinary commercial condition is not suitable for acid leaching because of the presence of sulphates. To purify the acid of sulphates, I proceed as follows: The acid (hydrochloric preferred) is diluted with water to 16% acid and thereto is added a hot concentrated solution of barium chloride. The resulting acid is free of sulphates and suitable for use as an acid leach. Other sulphate free acids may be used instead.

The ore is leached with the sulphate free acid, preferably with boiling, which treatment results in the radium content being dissolved. This mixture of acid and ore I then treat to recover the radium values as follows:

The sands are separated from the slimes and the solution by decantation. Thereafter the slimes are separated, by further decantation, from the solution. The sands and slimes, so as to recover the radium values contained therein, are washed with water purified of sulphates by adding to the water a calculated amount of barium chloride, depending upon the amount of $SO_4$ present in the water. The resulting solutions may be treated by any suitable process to recover the radium values, together with that portion of uranium and vanadium that has not been recovered by the alkali pressure treatment. Should the first yield of radium be not quantitative, this process may be repeated with the slimes obtained in the decantation.

I claim:

1. In the described process of treating carnotite or allied ores, to extract therefrom its radioactive constituents, the step which consists in heating the ore with soda ash under pressure of from sixty to one hundred pounds in the presence of moisture.

2. In the described process of treating carnotite, or allied ores, to extract therefrom its radioactive constituents, the step which consists in heating the ore with soda ash to a temperature corresponding to sixty to one hundred pounds pressure for a period of about six hours, in the presence of moisture.

3. The described process of treating carnotite and allied ores to extract therefrom radio-active constituents, consisting in heating under pressure about 1 ton of ore to about 30% soda ash (by weight) in order to render the sulphates contained in the ore water soluble and maintaining the treatment free from sulphates artificially formed and thereafter washing the resulting product and extracting the radio-active material.

In testimony whereof, I have hereunto set my hand.

WILLIAM A. SCHLESINGER.